United States Patent [19]

Wilder

[11] Patent Number: 5,047,450

[45] Date of Patent: Sep. 10, 1991

[54] POLYETHYLENE TEREPHTHALATE MOLDING RESIN BLENDS

[75] Inventor: Charles R. Wilder, Bartlesville, Okla.

[73] Assignee: Phillips Petroleum Company, Bartlesville, Okla.

[21] Appl. No.: 327,888

[22] Filed: Mar. 23, 1989

Related U.S. Application Data

[63] Continuation-in-part of Ser. No. 177,731, Apr. 5, 1988, abandoned.

[51] Int. Cl.$^5$ .............................. C08K 7/14; C08K 3/40
[52] U.S. Cl. ................................... 523/435; 523/437; 524/409; 524/494; 524/513
[58] Field of Search .............. 264/326; 523/435, 437; 524/494, 513, 409; 525/444

[56] References Cited

U.S. PATENT DOCUMENTS

| | | | |
|---|---|---|---|
| 3,405,198 | 10/1968 | Rein | 525/177 |
| 3,560,605 | 2/1971 | Siggel et al. | 264/326 |
| 3,579,609 | 5/1971 | Savenich | 525/177 |
| 3,585,255 | 6/1971 | Sevenich | 525/176 |
| 3,595,818 | 7/1971 | Weissermel et al. | 524/114 |
| 3,639,527 | 2/1972 | Brinkman et al. | 525/64 |
| 3,769,260 | 10/1973 | Segal | 524/605 |
| 3,892,667 | 7/1975 | Touval | 252/8.1 |
| 3,897,389 | 7/1975 | Touval | 524/41 |
| 3,960,807 | 6/1976 | McTaggart | 524/513 |
| 3,975,354 | 8/1976 | Buxbaum et al. | 524/409 |
| 4,097,446 | 6/1984 | Abolins et al. | 524/445 |
| 4,107,231 | 8/1978 | Wurmb et al. | 524/412 |
| 4,122,061 | 10/1978 | Holub | 524/513 |
| 4,151,223 | 4/1979 | Newberg et al. | 526/293 |
| 4,172,859 | 10/1979 | Epstein | 525/109 |
| 4,215,032 | 7/1980 | Kobayashi et al. | 525/437 |
| 4,223,113 | 9/1980 | Bier et al. | 525/439 |
| 4,338,243 | 7/1982 | Hecht et al. | 524/287 |
| 4,344,874 | 8/1982 | Akagi et al. | 524/513 |
| 4,349,503 | 9/1982 | Aharoni | 264/328.16 |
| 4,368,295 | 1/1983 | Newton et al. | 525/166 |
| 4,385,144 | 5/1983 | Jones et al. | 524/114 |
| 4,412,040 | 10/1983 | Albee, Jr. et al. | 525/143 |
| 4,463,121 | 7/1984 | Gartland et al. | 524/291 |
| 4,476,274 | 10/1984 | Liu | 524/445 |
| 4,486,561 | 12/1984 | Chung et al. | 524/107 |
| 4,533,679 | 8/1985 | Rawlings | 523/204 |
| 4,539,352 | 9/1985 | Chung et al. | 524/109 |
| 4,572,852 | 2/1986 | Gartland et al. | 428/35 |

Primary Examiner—Lewis T. Jacobs
Attorney, Agent, or Firm—A. W. Umphlett

[57] ABSTRACT

Glass fiber reinforced polyethylene terephthalate molding resin blends are provided which crystallize rapidly after being injection molded and which have engineering resin performance characteristics. In addition to polyethylene terephthalate and glass fibers, the blends contain an aliphatic polyester, an ionic hydrocarbon polymer, an antioxidant, and, optionally, polythylene and/or a polymeric epoxy compound. The blends can be flame retarded with a brominated polystyrene and an antimonate without substantial loss of, or change in, properties.

17 Claims, No Drawings

POLYETHYLENE TEREPHTHALATE MOLDING RESIN BLENDS

This application is a continuation-in-part of application Ser. No. 07/177,731, filed Apr. 5, 1988, now abandoned.

This invention lies in the field of glass fiber reinforced polyethylene terephthalate molding resin blends.

Polyethylene terephthalate molding resin blends which are reinforced with glass fibers, asbestos fibers, or other fibrous mineral material are known, as are polyethylene terephthalate blends which are able to crystallize relatively rapidly (as desired) after being injection molded into the typical water cooled molds employed in the injection molding industry (which attain surface mold temperatures ranging from about 85° to 110° C.). Oil cooled molds, which have higher mold surface temperatures, may, of course, be used if desired.

It is difficult to get fiber reinforced polyethylene terephthalate molding resin blends to display both rapid crystallization characteristics and a combination of acceptably high, from a commercial viewpoint, thermal and mechanical properties. Thus, even when a particular polyethylene terephthalate molding resin blend displays both good crystallization characteristics and, after injection molding, some good strength characteristics, it may not be suitable for use in many molding resin blend applications because it does not also possess other commercially required characteristics. For example, apart from crystallization rate, for use in so-called engineering resin applications, a glass fiber reinforced polyethylene terephthalate molding resin blend needs to have the following combination of minimal level resin performance characteristics:

a relatively low flow rate after molding (typically ranging from about 3 to about 10 g/10 min. measured at 275° C. using 2.16 kg);

an adequate combination of minimal physical strength characteristics in a molded body at ambient temperatures; for example, a flexural modulus of at least about 1.4 million psi, a flexural strength of at least about 27 thousand psi, a tensile strength at break of at least about 18 thousand psi, an elongation at break of at least about 2 percent, an Izod strength (notched) of at least about 1.4 ft.lb./in., and an Izod strength (unnotched) of at least about 8 ft.lb./in.;

a heat distortion temperature after molding of at least about 210° C. at a load of 1820 kiloPascals (kPa);

a commercially acceptable molding temperature window as shown, for example, by differential scanning calorimeter data, such as follows:

a Tg of not more than about 75° C.
a Tcc of not more than about 117° C.
a Tm of at least about 250° C.
a Tmc of at least about 200° C., and
a crystallization window of at least about 47; and an ability to produce a molded part which has a smooth, glossy surface after such part is removed from a mold which has a mold surface temperature at or below about 110° C.

It is also difficult to get a fiber reinforced polyethylene terephthalate molding resin blend which displays an after-molding flow rate which is greater than about 10 g/10 min (measured as above indicated). For example, one prior art effort to increase flow rate of such a blend is understood to have involved water addition thereto in a manner apparently aimed at achieving a controlled and limited hydrolysis of the polyethylene terephthalate ester linkages. This procedure is considered to be unsatisfactory from a practical standpoint because the effect of the water is difficult to control, and because a loss of desirable resin blend properties seems to be associated with the water addition.

A fiber reinforced polyethylene terephthalate resin blend intended for engineering resin applications and which accordingly has a commercially acceptable combination of desirable physical and chemical properties, such as the combination above indicated, should also be capable to having flame retardant material added thereto in an amount effective for achieving flame retardancy without a significant or commercially unacceptable loss of properties in such combination. However, in practice, it has proven to be difficult indeed to compound a fiber glass reinforced, rapidly crystallizable polyethylene terephthalate molding resin blend which not only has a commercially suitable combination of properties, but which also has the capacity to be diluted by up to about 1/5 or even more with a flame retardant system without causing unacceptable adverse changes in properties.

There is a need in the art of reinforced polyethylene terephthalate molding resin blends for rapidly crystallizable blends which also have engineering resin performance characteristics. Also, there is a need in the art for blends of this type which display high after-molding flow rates without water addition and without lubricant addition. In addition, it would be desirable for such blends to have the capacity to be flame retarded to an acceptable extent by the admixture therewith of flame retardant(s) without excessive loss of performance characteristics.

SUMMARY OF THE INVENTION

An object of the present invention is to provide a new and improved class of glass fiber reinforced polyethylene terephthalate compositions which have an excellent combination of rapid crystallization, physical strength, flow rates, heat distortion temperatures and molding window temperatures.

Another object is to provide such a composition which can be easily and reliably prepared by melt extrusion.

Another object is to provide a fiber glass reinforced polyethylene terephthalate molding composition which has engineering resin performance characteristics and which is rapidly crystallizable, and which has outstandingly high after-molding flow rates.

Another object is to provide such a composition which can be molded by a conventional procedure with conventional equipment and still obtain engineering resin performance characteristics with rapid crystallization.

Another object is to provide such a composition which can be flame retarded through the addition thereto of further additives which when so added do not cause a significant reduction in desired properties.

Another object is to provide processes for making and using such a composition.

Other and further objects, aims, purposes, features, advantages, embodiments, and the like will become apparent to those skilled in the art from the teachings of the present specification taken with the appended claims.

The present invention is directed to a class of new and very useful molding resin blends of glass fiber reinforced polyethylene terephthalate which have:

(a) a surprising and unexpectedly high after-molding flow rate after being injection molded, and (b) a surprising and unexpectedly rapid crystallization rate after being injection molded—along with acceptable engineering resin performance characteristics, such as physical strength, heat distortion, molding window, and surface appearance.

A rapid crystallization rate, among other advantages, permits the achievement of rapid mold cycle times, as those skilled in the art will readily appreciate.

A high-molding flow rate among other advantages, permits an injected resin to fill all cavities of an intricate mold, as those skilled in the art will readily appreciate.

In addition, the molding resin blends of this invention retain to an unexpected and remarkable extent such an acceptable combination of performance characteristics when a selected class of flame retardants is admixed therewith even up to a level of about 20 weight percent, or even somewhat higher, if desired. This achievement with such flame retardants is particularly unexpected because various other flame retardants cannot even be mixed with a molding resin blend of this invention under extrusion mixing conditions without causing a significant and unacceptable deterioration of the polyethylene terephthalate matrix resin (for reasons which are not now known).

Although the molding resin blends of this invention use a plurality of additives in combination with polyethylene terephthalate, these additives coact with each other and with the polyethylene terephthalate as demonstrated by the circumstance that the above indicated desired combination of engineering resin performance characteristics is not achieved unless all such components are present within the respective quantity ranges taught.

Optionally, an additional type of additive can be compounded with a blend of this invention to improve further the impact strength properties of a product molded body made from an extruded molding resin blend of this invention.

More particularly, the molding resin blends of this invention are compositions comprising (on a 100 weight percent total basis):

(a) from about 30 to about 75 weight percent of polyethylene terephthalate having an intrinsic viscosity of at least about 0.25;

(b) from about 25 to about 65 weight percent of glass fibers having an average cross-sectional thickness in the range from about 7 to about 15 microns and an average length in the range from about 2 to about 8 millimeters;

(c) from about 0.5 to about 7 weight percent of aliphatic polyester having a number average molecular weight ranging from about 7,500 to about 20,000 and which is a condensation product of a dialkanoic acid containing from about 8 to about 12 carbon atoms per molecule and a dialkanol containing from 2 to about 5 carbon atoms per molecule;

(d) from about 0.1 to about 7 weight percent of a metal salt of an ionic hydrocarbon copolymer of an alpha-olefin containing from 2 to 5 carbon atoms per molecule and an alpha, beta ethylenically unsaturated carboxylic acid containing from 3 to about 5 carbon atoms per molecule in which copolymer the carboxyl groups have been at least partially neutralized with cations of said metal, said polymer having a molecular weight before such neutralization of at least about 3,000, said metal being selected from the group consisting of sodium and potassium;

(e) from about 0.1 to about 1 weight percent of an antioxidant, and (f) from 0 to about 3 weight percent of a polyethylene having a number average molecular weight in the range from about 500 to about 10,000.

Preferably, the thus-described blend consists essentially of ingredients (a)-(e).

Optionally, to increase impact strength, such a blend of this invention can additionally contain from greater than 0 to about 3 weight percent of a polymeric epoxy compound of the type comprised of a condensation product of bisphenol A with epichlorohydrin. The average number of repeating units of bisphenol A/epichlorohydrin per molecule in such a condensate can range from about 0.1 to about 20.

To flame retard a blend of this invention, one admixes therewith from greater than 0 to about 20 weight percent, or even a higher amount if desired (as when a change in other molded product properties is not objectionable), of a composition consisting essentially of:

(a) brominated polystyrene having a number average molecular weight ranging from about 200,000 to about 400,000, and having a bromine content in the range from about 55 to about 75 weight percent (based on total weight of the brominated polystyrene), and (b) antimonate of at least one metal selected from Group I, Group II, and Group VII of the Periodic Table—wherein the weight ratio of said brominated polystyrene to said antimonate ranges from about 2:1 to about 12:1.

DETAILED DESCRIPTION

The Polyethylene Terephthalate

The polyethylene terephthalate employed herein has an inherent viscosity of preferably at least about 0.25, preferably about 0.4 as measured by ASTM D-2857. The polyethylene terephthalate preferably has an upper limit on inherent viscosity of about 1.2. Inherent viscosity is measured in a 3:1 volume ratio of methylene chloride and trifluoroacetic acid at 30° C. The polyethylene terephthalate can optionally contain up to 50 percent by weight of other comonomers, such as diethylene glycol, glutaric acid, polybutylene terephthalate, polyalkylene oxide, cyclohexane dimethanol, and other diols. Mixtures of polyethylene terephthalate resins can be used. Suitable polyethylene terephthalate polymers are commercially available.

The Glass Fibers

The glass fibers have an average cross-sectional thickness in the range from about 7 to 15 preferably about 8 to about 10 microns and an average length in the range from 2 to about 8 millimeters, preferably about 2.5 to about 5 millimeters. Such glass fibers are commercially available.

The Polyester

Polyesters have a number average molecular weight in the range from about 7,500 to about 20,000, preferably about 8,000 to about 10,000. Preferred dialkanoic acid comonomers for such polyesters contain 8 to 10 carbon atoms per molecule and preferred dialkanol comonomers for such polyesters contain 3 to 4 carbon atoms per molecule. One presently most preferred such polyester is a condensation product of sebacic acid with 1,2 propanediol. Characteristically, the polyester is in the physical form of a liquid at ambient conditions. It is believed that the polyester reacts with the resin matrix during extrusion processing conditions.

The Ionic Hydrocarbon Copolymer

Representatives of the ionic hydrocarbon copolymer are sodium and/or potassium salts of copolymers of such olefins (especially ethylene) with acrylic acid, methacrylic acid, or mixtures thereof which are at least about 30 percent neutralized. Suitable polymers are commercially available.

The polyester and the ionic hydrocarbon copolymer (also known as ethylene acid copolymer or ionomer) are believed to cooperate with one another in a synergistic manner when in combination with polyethylene terephthalate to induce rapid crystallization of the polyethylene terephthalate when such combination is melt injected into a mold having a surface temperature at about or under 110° C., and to result in good molded product properties. Typical crystallization times with such a mold temperature are characteristically not more than about 30 seconds.

The Polyethylene

The polyethylene has a number average molecular weight ranging from about 500 to about 10,000, preferably about 600 to about 3,000. Such polymers are commercially available. Representatives include the trademarked materials "Epolene N34" or "Epolene C-10" from Eastman Chemical Company and "Polywax 500", "Polywax 655", and "Polywax 1000" from Petrolite Specialties Polymer Group.

The Antioxidant

Many different antioxidants can be used. In general, preferred antioxidants are thermally stable at the processing temperature employed. Hindered phenol antioxidants are presently preferred. The antioxidant which is presently most preferred is available from Ciba-Geigy Corporation as "Irganox 1010", the active component of which is believed to be tetrakis (methylene 3-[3,5-di-t-butyl-4-hydroxyphenyl]propionate) methane. Other suitable antioxidants include:
(A) Borg Warner's "Ultranox 626" the active agent of which is bis[2,4-di-t-butyl phenyl pentaerythritol]diphosphite;
(B) Ciba-Geigy's "Irganox 259" the active agent of which is 1,6-hexamethylene bis(3,5-di-t-butyl-4-hydroxy-hydrocinnamate) and/or 1,6-hexamethylene bis (3-[3,5-di-t-butyl-4-hydroxyphenyl]-propionate);
(C) Ferro Corporation's "OXI-Chek 116", the active agent of which is octadecyl 3,5-di-t-butyl-4-hydroxyhydrocinnamate; and
(D) Ciba-Geigy's "Irganox 1098", the active agent of which is n,n'-hexamethylene bis[3,5-di-t-butyl-4-hydroxyhydrocinnamide].

The Polymeric Epoxy Compound

Such polymers are commercially available. Representatives include the trademarked products "Epon 828", "Epon 1001 F", and "Epon 1009 F" available from Shell Chemical Company.

The Brominated Polystyrene

Preferably, the bromine content is at least about 60 weight percent of such polymer. Preferably, such polymer has a number average molecular weight ranging from about 200,000 to about 400,000, preferably about 225,000 to about 350,000. Such brominated polystyrene is available commercially.

For purposes of achieving flame retardancy, the combined weight of the brominated polystyrene and the antimonate (see below) in a resin blend is preferably at least about 4 weight percent of the total resin blend. A presently preferred weight ratio of brominated polystyrene to antimonate compound(s) from about 3:1 to about 10:1.

The Antimonate

A presently particularly preferred antimonate is sodium antimonate although zinc antimonate and nickel antimonate and mixtures thereof are also preferred. The antimonate is usually employed in a finely-divided particulate or powder form.

Other Additives

In addition to the components discussed herein, the blends of the invention may contain other additives commonly employed (and in the quantities known to the art) with polyethylene terephthalate, such as, for examples, colorants, mold release agents, tougheners, heat and ultraviolet light stabilizers, fillers, and the like. Usually, the total quantity of such other additives is not more than about 20 weight percent of a total resin blend although higher amounts could be used if desired.

Preparation

The blend compositions are prepared by blending together the components by any convenient means. For example, dry polyethylene terephthalate can be dry mixed in any suitable blender or tumbling means with the other components and the resulting mixture melt-extruded. Preferably, the polyester is preblended with the glass fibers and then this mixture is itself dry mixed with the other additives before melt-extrusion. A convenient melt extrusion temperature ranges from about 540° to 580° F. (282° to 304° C.). The extrudate is preferably in a strand form which can be chopped into pellets or the like as desired.

Composition

The molding resin blend compositions of this invention are summarized by the following Table I:

TABLE I

| | | Quantity (100 wt. % basis) | |
|---|---|---|---|
| I.D. No. | COMPONENT | Broad Range wt. % | Preferred Range wt. % |
| 1. | Polyethylene Terephthalate | 30–75 | 38.4–63.6 |
| 2. | Glass fibers | 25–65 | 30–45 |
| 3. | Polyester | 0.5–7 | 2.7–4.6 |
| 4. | Ionic Hydrocarbon Copolymer | 0.1–7 | 0.4–0.6 |
| 5. | Polyethylene | 0–3 | 0.1–1.5 |
| 6. | Antioxidant | 0.1–3 | 0.4–0.6 |
| 7. | Epoxy Compound | 0–5 | 0.5–0.95 |
| 8. | (Flame Retardant)* | 0–20 | 12.5–15.9 |

*Weight ratio of brominated polystyrene to metal antimonate specified above.

Usage and Characteristics

The molding resin blend compositions of this invention are conventionally moldable and are useful in engineering resin applications as shown by their characteristics as illustrated, for example, in Table II below. Table II presents properties for resin blends of the invention and molded bodies made therefrom which have glass fiber contents ranging from about 30 to about 45 weight percent (100 weight percent total blend basis). Table II demonstrates the rapid crystallization and high after-molding flow rates characteristic of these blends.

A blended, melt extruded, pelletized composition of this invention can be conventionally injection molded, for example, using an injection molding temperature with range from about 520° to 580° C. (271° to 304° C.) into molds typically ranging in surface temperature from about 185° to about 230° F. (85°–110° C.).

Item 3.2.4: "Tmc" references the temperature at which a molten polymer starts to crystallize, degrees C.

Item 3.2.5: "Cw" references the crystallization window as defined by the equation: (Tmc−Tcc)/(Tm−Tg) multiplied by 100 (where Tmc, Tcc, Tm, and Tg have their above defined meanings).

Item 5: Crystallization time is measured in seconds.

The following examples are presented in further illustration of the invention and are not to be considered as unduly limiting the scope of this invention.

EXAMPLES 1-10

TABLE II

| Properties | art recognized engineering resin minimal values | non-flame retarded w/out epoxy compound[1] | flame retarded w/out epoxy compound[2] |
|---|---|---|---|
| 1. Flow rate after molding | 3–10 | 23–27 | 31–58 |
| 2. Strength | | | |
| 2.1 flexural modulus | at least 1.4 | 1.5–2.1 | 1.4–2.3 |
| 2.2 flexural strength | at least 27 | 34.0–39.0 | 27.9–29.7 |
| 2.3 tensile strength (at break) | at least 18 | 20.2–20.9 | 18.0–19.7 |
| 2.4 elongation | at least 2 | 4.1–4.9 | 3.0–3.9 |
| 2.5 Izod (notched) | at least 1.4 | 2.1–2.2 | 1.4–1.9 |
| 2.6 Izod (unnotched) | at least 8 | 15.9–20.0 | 8.2–9.8 |
| 3. Thermal Characteristics | | | |
| 3.1 heat distortion | at least 210 | 221–227 | 212–222 |
| 3.2 DSC | | | |
| 3.2.1 Tg | not more than 75 | 73–75 | 71–72 |
| 3.2.2 Tcc | not more than 117 | 119–120 | 117–118 |
| 3.2.3 Tm | at least 250 | 252–254 | 253–254 |
| 3.2.4 Tmc | at least 200 | 205–209 | 204–206 |
| 3.2.5 Cw | at least 47 | 48 | 47–49 |
| 4. Surface appearance | smooth & glossy | smooth & glossy | smooth & glossy |
| 5. Crystalliz. time | about 30–90 | less than 30 | less than 30 |

Footnotes for Table II:
[1] Invention blends without flame retardant
[2] Invention blends with flame retardant

Comments On Table II

Item 1: Flow rate (before and after molding) is measured in an extrusion plastometer by ASTM procedure D1238 at 275° C. using a 2.16 kilogram load as grams per 10 minutes.

Items 2.1 and 2.2: Flexural modulus and flexural strength are each measured in accordance with the procedure defined in ASTM D790 in million psi and in thousand psi, respectively.

Items 2.3 and 2.4: Tensile strength at break and elongation at break are each measured in accordance with the procedure defined in ASTM D638 in thousand psi and in percent, respectively.

Items 2.5 and 2.6: Izod impact strength both notched and unnotched is measured in accordance with the procedure defined in ASTM D256 in ft.lb./in.

Item 3.1: Heat distortion is measured in accordance with the procedure described in ASTM D648 in degrees C. at a load of 1820 kiloPascals.

Item 3.2: "DCS" references thermal data determined by a Differential Scanning Calorimeter.

Item 3.2.1: "Tg" references glass transition temperature, degrees C.

Item 3.2.2: "Tcc" references the temperature at which an amorphous polymer starts to crystallize when heated, degrees C.

Item 3.2.3: "Tm" references the melt temperature at ambient pressure, degrees C.

The following examples illustrate molding resin blends of this invention and their properties. All of the data are based on actual runs, although some values are averages of a plurality of runs.

A series of dry blends were prepared by tumble mixing the respective components together, each blend having a composition as summarized in Table III below. The polyethylene terephthalate was preliminarily dried for about 16 hours at 250° F. (121° C.) in a vacuum oven. Each blend was further mixed by being melt extruded through a 38 mm single screw extruder at a melt temperature of about 580° F. (304° C.). The melt from the extruder was passed through a stranding die and the strand was cooled and chopped into pellets. The pellets were dried at about 250° F. (121° C.) for about 16 hours in a vacuum oven.

The dried, chopped strands were molded in a 1.5 ounce injection molding machine at approximately 540° F. (282° C.) with a fast ram using a delayed injection time of 0.1 second, a hold time of 4 seconds, a cool time of 25 seconds, and an open time of 3 seconds. The mold cavity surface temperature was 235° F. (113° C.). The objects molded include an ASTM standard "dog bone" and an impact bar for Izod impact testing, heat distortion testing, and flexural property testing.

The properties of each resin blend and of objects molded therefrom are summarized in Table IV below. These properties show that these blends have engineering resin performance characteristics with rapid crystallization rates and high after-molding flow rates.

TABLE III

Composition of Examples 1-10
Composition in Weight Percent

| I.D. No. | COMPONENT Identity | footnote | Example Number | | | | | | | | | |
|---|---|---|---|---|---|---|---|---|---|---|---|---|
| | | | 1 | 2 | 3 | 4 | 5 | 6 | 7 | 8 | 9 | 10 |
| 1. | Polyethylene Terephthalate | 1 | 63.6 | 49.9 | 49.0 | 38.4 | 63.6 | 64.2 | 64.2 | 50.5 | 49.6 | 39.0 |
| 2. | Glass fibers | 2 | 30 | 45 | 30 | 45 | 30 | 30 | 30 | 45 | 30 | 45 |
| 3. | Polyester | 3 | 4.6 | 3.5 | 3.5 | 2.7 | 4.6 | 4.6 | 4.6 | 3.5 | 3.5 | 2.7 |
| 4. | Ethylene Acid Copolymer | 4 | 0.6 | 0.5 | 0.5 | 0.4 | 0.6 | 0.6 | 0.6 | 0.5 | 0.5 | 0.4 |
| 5. | Antioxidant | 5 | 0.6 | 0.5 | 0.5 | 0.4 | 0.6 | 0.6 | 0.6 | 0.5 | 0.5 | 0.4 |
| 6. | Polyethylene (Flame retardant) | 6 | 0.6 | 0.6 | 0.6 | 0.6 | 0.6 | — | — | — | — | — |
| | | | — | — | (15.9) | (12.5) | — | — | — | — | (15.9) | (12.5) |
| 7. | Sodium Antimonate | 7 | — | — | 4.0 | 3.1 | — | — | — | — | 4.0 | 3.1 |
| 8. | Brominated Polystyrene | 8 | — | — | 11.9 | 9.4 | — | — | — | — | 11.9 | 9.4 |
| | Total Composition Wt. % | — | 100 | 100 | 100 | 100 | 100 | 100 | 100 | 100 | 100 | 100 |

Table III Footnotes:
1 The polyethylene terephthalate has intrinsic viscosity of about 0.65.
2 The glass fibers are obtained from the manufacturer, Owens-Corning Company under the trade designation 492-AA. These fibers are believed to have average diameters of about 9 microns and average lengths of about 3 millimeters. The fibers are initially in the form of clumps.
3 The polyester is obtained from C. P. Hall Company under the trademark "Paraplex G-25" and is believed to be a condensation product of sebacic acid and 1,2-propanediol. The polyester has a number-average molecular weight of about 8,000.
4 The ethylene acid copolymer is obtained from Schulman Company under the trademark "Formion 105" and is believed to be a copolymer of ethylene and methacrylic acid containing about 10 weight percent methacrylic acid which is 50 weight percent neutralized with sodium. This copolymer is believed to have a number average molecular weight in excess of 5,000 before salt formation.
5 The antioxidant is obtained from Ciba-Geigy Corporation under the trademark "Irganox 1010" and the active component thereof is believed to be tetrakis [methylene 3-(3,5-di-t-butyl-4-hydroxyphenyl) propionate] methane.
6 The polyethylene is obtained from Petrolite Speciality Polymers Group under the trademark "Polywax 655". The material is a crystalline wax which is believed to have a number average molecular weight of about 700.
7 The sodium antimonate is obtained from M&T Chemicals under the trademark "Thermogard FR".
8 The brominated polystyrene is obtained from Ferro Corporation under the trademark "Pyro-Chek 68PB" and is believed to have a number average molecular weight of from about 280,000 to about 300,000. This polymer is also believed to have a bromine content of about 68 weight percent (total brominated polystyrene weight basis).

TABLE IV

| Properties | Composition Example Number | | | | | | | | | |
|---|---|---|---|---|---|---|---|---|---|---|
| | 1 | 2 | 3 | 4 | 5 | 6 | 7 | 8 | 9 | 10 |
| 1. Flow rate after molding | 23 | 27 | 31 | 58 | 80 | 97 | 108 | 102 | 190 | 108 |
| 2. Strength | | | | | | | | | | |
| 2.1 flexural modulus | 1.5 | 2.1 | 1.4 | 2.3 | 1.5 | 1.5 | 1.5 | 2.1 | 1.5 | 2.3 |
| 2.2 flexural strength | 34.0 | 39.0 | 27.9 | 29.7 | 34.5 | 34.6 | 34.8 | 39.3 | 25.6 | 26.8 |
| 2.3 tensile strength (at break) | 20.2 | 20.9 | 18.0 | 19.7 | 22.4 | 21.9 | 21.9 | 24.3 | 18.3 | 19.0 |
| 2.4 elongation | 4.9 | 4.1 | 3.9 | 3.0 | 5.2 | 5.1 | 4.9 | 3.9 | 4.0 | 3.5 |
| 2.5 Izod (notched) | 2.1 | 2.2 | 1.9 | 1.4 | N/D | — | — | — | — | — |
| 2.6 Izod (unnotched) | 15.9 | 20.0 | 9.8 | 8.2 | N/D | — | — | — | — | — |
| 3. Thermal Characteristics | | | | | | | | | | |
| 3.1 heat distortion | 221 | 227 | 212 | 222 | N/D | N/D | 230 | 229 | 217 | 220 |
| 3.2 DSC | | | | | | | | | | |
| 3.2.1 Tg | 73 | 75 | 72 | 71 | 74 | 74 | 74 | 74 | N/D | N/D |
| 3.2.2 Tcc | 119 | 120 | 118 | 117 | 122 | 122 | 121 | 120 | N/D | N/D |
| 3.2.3 Tm | 254 | 252 | 254 | 254 | 254 | 254 | 254 | 253 | N/D | N/D |
| 3.2.4 Tmc | 205 | 205 | 204 | 206 | 205 | 203 | 206 | 207 | N/D | N/D |
| 3.2.5 Cw | 48 | 48 | 47 | 49 | 46 | 45 | 47 | 48 | N/D | N/D |
| 4. Surface Appearance | S & G* | S & G* | S & G* | S & G* | VSD* | SD* | VSD* | SD* | SD* | G* |
| 5. Crystallization time | under 30 | under 30 | under 30 | under 30 | — | — | — | — | — | — |

*S & G = "smooth and glossy", VSD = "very slightly dull", SD = "slightly dull", G = "glossy"
In Table IV, all property items are measured in the same manner and in the same units as specified in the comments for Table II above, except flow rate examples 5-10 measured at 275° C. using a 5 kilogram load.

EXAMPLES 11-13

The following examples illustrate instances where molding resin blends of this invention experienced dramatic loss in properties when compounded with flame retardants other than those taught herein for the practice of this invention. All of the data is based on actual runs, although some values are averages of a plurality of runs.

A series of dry blends were prepared by tumble mixing the respective components together, each blend having a composition as summarized in Table V below. Each blend was then subjected to a further mixing attempt in the same melt extruder operating under similar conditions as specified in Examples 1-10 above. In the case of each of these blends, it was found that the blend could not be melt extruded due to decomposition in the extruder barrel of polyethylene terephthalate polymer, flame retardant(s), and perhaps other additives present. The cause of these observed results is unknown presently.

TABLE V

TABLE III: Composition of Examples 11-13

| I.D. No. | COMPONENT Identify[4] | Composition Example Number | | |
|---|---|---|---|---|
| | | 11 | 12 | 13 |
| 1. | Polyethylene Terephthalate | 53.8 | 53.8 | 53.8 |
| 2. | Glass fibers | 30 | 30 | 30 |
| 3. | Ethylene Acid Copolymer | 0.3 | 0.3 | 0.3 |
| 4. | Polyester | 3.8 | 3.8 | 3.8 |
| 5. | Antioxidants | 0.5 | 0.5 | 0.5 |
| 6. | Sodium Antimonate | 1.4 | 1.4 | 1.4 |
| 7. | F.R.A.[1] | 9.6 | — | — |
| 8. | F.R.B.[2] | — | 9.6 | — |
| 9. | F.R.C.[3] | — | — | 9.6 |

TABLE V-continued

TABLE III: Composition of Examples 11-13

| I.D. No. | COMPONENT Identify[4] | Composition Example Number | | |
|---|---|---|---|---|
| | | 11 | 12 | 13 |
| | Total Composition wt. % | 100 | 100 | 100 |

Table V footnotes:
[1]F.R.A. (flame retardant A) is tetrabromophthalic anhydride
[2]F.R.B. (flame retardant B) is phenoxy terminated tetrabromobisphenol-A
[3]F.R.C. (flame retardant C) is tetrabromobisphenol-A-bis(2 hydroxyethyl ether)
[4]The individual components identified in the Table V Examples are the same as those identified in the Table III Examples.

EXAMPLES 14 AND 15

The procedure of Examples 1 and 3 was repeated except that 1.0 weight percent of an epoxy copound ("Epon 828") was added to the initial mixture replacing an equal weight of such polyethylene terephthalate. All of the results are based on actual runs, although some values are averages of a plurality of runs.

After melt extrusion and injection molding as described for Example 1 and 3, the molded articles were evaluated and it was found that the properties are similar to those for such Examples 1 and 3 except that Izod impact strength (notched and unnotched) is improved.

While this invention has been described in detail for the purpose of illustration, it is not to be construed as limited thereby but is intended to cover all changes and modifications within the spirit and scope thereof.

That which is claimed is:

1. A molding resin blend which has a high after-molding flow rate, which crystallizes rapidly after being injection molded, and which has engineering resin performance characteristics, said blend comprising on a 100 weight percent total blend basis:
   (a) from about 30 to about 75 weight percent of polyethylene terephthalate having an inherent viscosity of at least about 0.25;
   (b) from about 25 to about 65 weight percent of glass fibers having an average cross-sectional thickness in the range from about 7 to about 15 microns and an average length in the range from about 2 to about 8 millimeters;
   (c) from about 0.5 to about 7 weight percent of a polyester having a number average molecular weight in the range from about 7,500 to about 20,000 and which is a condensation product of a dialkanoic acid containing from about 8 to 12 carbon atoms per molecule and a dialkanol containing from 2 to about 5 carbon atoms per moleucle;
   (d) from about 0.1 to about 7 weight percent of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;
   (e) from about 0.1 to about 1 weight percent of an antioxidant; and
   (f) from 0 to about 3 weight percent of a polyethylene having a number average molecular weight in the range from about 500 to about 10,000.

2. A blend of claim 1 which additionally contains from greater than 0 to about 3 weight percent of a polymeric epoxy compound comprised of a condensate of bisphenol A and epichlorohydrin and containing an average of from about 0.1 to about 20 repeating units of bisphenol A/epichlorohydrin per molecule.

3. A blend of claim 1 which additionally contains from greater than 0 to about 20 weight percent of a flame retardant composition consisting essentially of:
   (a) brominated polystyrene having a number average molecular weight ranging from about 200,000 to about 400,000 and having a bromine content in the range of from about 55 to about 75 weight percent based on the total weight of said brominated polystyrene; and
   (b) an antimonate of at least one metal selected from Groups I, II or VII of the Periodic Table, the weight ratio of said brominated polystyrene to said antimonate being in the range from about 2:1 to 12:1.

4. A blend of claim 3 wherein said antimonate is selected from the group consisting of sodium antimonate, zinc antimonte, and nickel antimonate.

5. A blend of claim 4 wherein said antimonate comprises sodium antimonate.

6. A blend of claim 2 which additionally contains from greater than 0 to about 20 weight percent of a flame retardant composition consisting essentially of:
   (a) brominated polystyrene having a number average molecular weight ranging from about 200,000 to about 400,000 and having a bromine content in the range of from about 55 to about 75 weight percent based on the total weight of said brominated polystyrene; and
   (b) an antimonate of at least one metal selected from Groups I, II or VII of the Periodic Table, the weight ratio of said brominated polystyrene of said antimonate being in the range from about 2:1 to 12:1.

7. A blend of claim 6 wherein said antimonate is selected from the group consisting of sodium antimonate, zinc antimonate, and nickel antimonate.

8. A blend of claim 7 wherein said antimonate comprises sodium antimonate.

9. A blend of claim 1 wherein said polyester has a number average molecular weight in the range from about 8,000 to about 10,000 and comprises a condensation product of sebacic acid and 1,2-propanediol.

10. A blend of claim 1 wherein said ionic hydrocarbon copolymer is comprised of ethylene and a carboxylic acid selected from the group consisting of acrylic acid, methacyclic acid, and mixtures thereof.

11. A blend of claim 1 wherein said antioxidant is a hindered phenol.

12. A blend of claim 1 wherein said polyethylene has a number average molecular weight in the range from about 600 to about 3,000.

13. A molded article produced by the process comprising:
   (1) forming a composition by mixing a blend comprising on a 100 weight percent total blend basis:
      (a) from about 30 to about 75 weight percent of polyethylene terephthalate having an inherent viscosity of at least about 0.25;
      (b) from about 25 to about 65 percent of glass fibers having an average cross-sectional thickness in the range from about 7 to about 15 microns and an average length in the range from about 2 to about 8 millimeters;

(c) from about 0.5 to about 7 percent of a polyester having a number average molecular weight in the range from about 7,500 to about 20,000 and which is a condensation product of a dialkanoic acid containing from about 8 to 12 carbon atoms per molecule and a dialkanol containing from 2 to about 5 carbon atoms per molecule;

(d) from about 0.1 to about 7 weight percent of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbons atoms per molecule in which copolymer the carboxyl groups have been at least partially neutralized with cations of said metal, said copolymer having a number average molecule weight in excess of about 3,000 prior to neutralization, said metal being selected from the group consisting of sodium and potassium;

(e) from about 0.1 to about 1 weight percent of an antioxidant;

(f) from 0 to about 3 weight percent of a polyethylene having a number average molecular weight in the range from about 500 to about 10,000;

(g) from greater than 0 to about 20 weight percent of a flame retardant composition consisting essentially of:
  (i) brominated polystyrene having number average molecular weight ranging from about 200,00 to about 400,000 and having a bromine content in the range of from about 55 to about 75 weight percent based on the total weight of said brominated polystyrene; and
  (ii) an antimonate of at least one metal selected from Groups I, II or VII of the Periodic Table, the weight ratio of said brominated polystyrene to said antimonate being in the range from about 2:1 to 12:1;

(2) melt extruding said composition to form a melt extruded composition; and (3) injecting said melt extruded composition at a temperature ranging from about 271° C. to about 304° C. into a mold having a surface mold temperature which is at or below about 110° C.

14. A article comprised of an injection molded resin blend of claim 1.

15. A article comprised of an injection molded resin blend of claim 2.

16. A article comprised of an injection molded resin blend of claim 3.

17. A article comprised of an injection molded resin blend of claim 6.

* * * * *